May 3, 1960  J. LESHIN  2,935,191
CONTAINER-DISPENSER
Filed Jan. 6, 1958
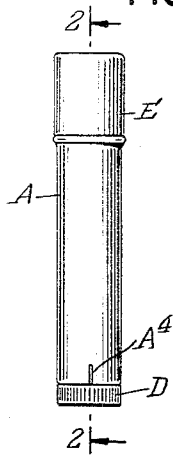
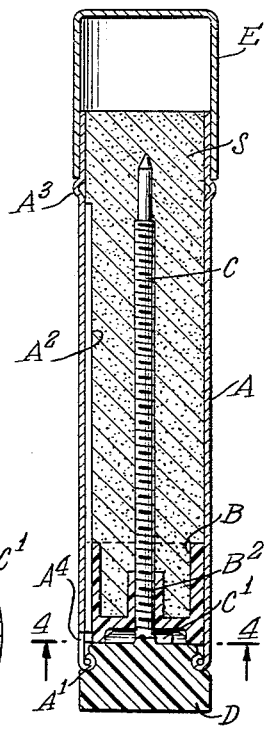
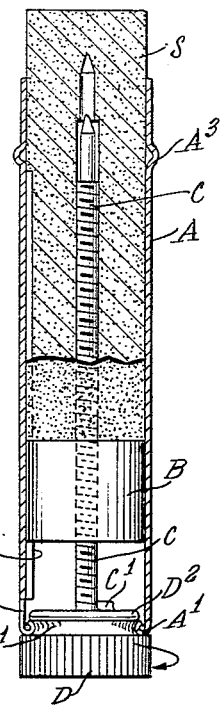
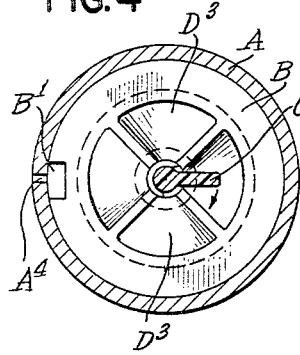
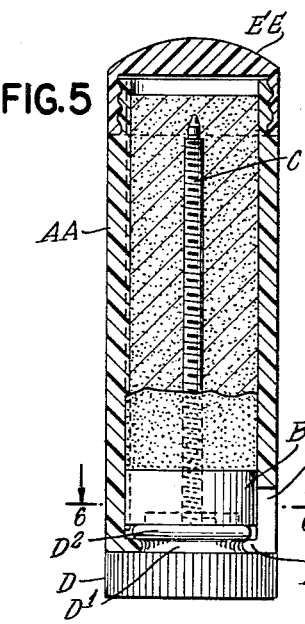
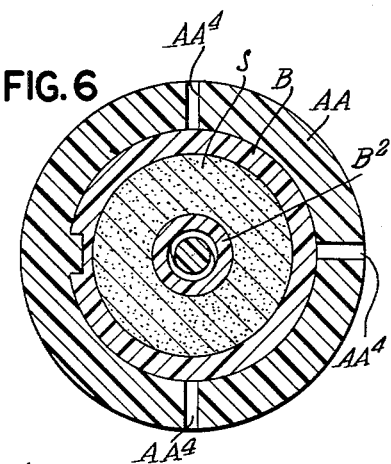
INVENTOR.
Joseph Leshin

United States Patent Office 2,935,191
Patented May 3, 1960

2,935,191

CONTAINER-DISPENSER

Joseph Leshin, Bronx, N.Y., assignor to Calumet Manufacturing Co., Inc., a corporation of New York Application January 6, 1958, Serial No. 707,325

3 Claims. (Cl. 206—56)

This invention relates to container-dispensers for cosmetics in solid stick form, such as cologne sticks, perfume sticks, deodorant sticks, antiseptic sticks, cream sticks, shaving sticks, etc., etc.

General objects of the invention are to provide a container-dispenser which is of simple, cheap, practical and durable construction and one which may be readily and quickly assembled.

In the specific embodiment illustrated, the container-dispenser comprises a tubular—preferably cylindrical—body closed at the bottom and open at the top for the projection of the stick, a follower embedded in the stick and slidably engaged with a rib on the body to project the stick from or retract it into the body, a long screw-threaded stem extending axially within the body and threaded to the follower for raising and lowering the latter within the body, a turning knob rotatably mounted on the base of the body and rigidly secured to the stem for rotating the latter in opposite directions to actuate the follower, and a removable cover to close the body at the top.

As a main feature of the invention, a swivel connection is provided between the turning knob and the tubular body, this swivel connection being created by an internal annular bead formed at the lower end of the body and an external annular groove formed in a reduced portion of the turning knob and extending upwardly into the body. The tubular body is also formed with one or more vertical slits extending through the annular bead to render the body resiliently expansible and contractible in its base zone, and the upper wall of the annular groove formed in the rotatable knob is constituted by an annular rib which has an outside diameter less than the inside diameter of the body and therefore spaced from the inside wall thereof. By reason of this construction, the parts may be readily assembled by inserting the turning knob into the lower end of the body with the exercise of a little force, the rib on the knob, by its engagement with the bead on the body, expanding the body circumferentially in its base zone sufficiently to allow the bead to snap into the annular groove of the turning knob once the knob has reached its home position in contact with the lower end of the body. The rotatable knob and the screw-threaded stem are made in one piece of molded plastic material to favor rapid and low cost production of this particular unit.

As a further feature of the invention, means are provided to prevent the rotatable knob from being turned in the wrong direction when the follower occupies its lowermost position so as thus to prevent stripping of the threads of the stem and follower.

Referring to the drawings:

Fig. 1 is an elevation of one form of container-dispenser with the removable cover in place;

Fig. 2 is an enlarged longitudinal section taken through the container-dispenser along the line 2—2 of Fig. 1;

Fig. 3 is a section similar to Fig. 2, but showing the cover removed and the follower raised to project the stick from the body;

Fig. 4 is a bottom view, partly in section, taken on the line 4—4 of Fig. 2;

Fig. 5 is a view, partly in longitudinal section and partly broken away, of a second form of container-dispenser; and Fig. 6 is a transverse section taken on the line 6—6 of Fig. 5.

Reference is first made to the embodiment shown in Figs. 1 to 4, which discloses a container-dispenser especially suitable for sticks of small size such as "chap sticks." Ordinarily, these chap stick containers are of the push type, but the present embodiment is of the swivel type.

The complete container-dispenser comprises the following parts: a cylindrical body A, a follower B, an exteriorly threaded stem C, a base turning knob D, and a removable cover E. The cylindrical body A and cover E are made of metal, while the follower B, stem C and knob D are made of molded plastic material, such as urea formaldehyde, nylon or the like. The knob D and stem C are molded in one piece.

The body A is formed at its extreme lower end with an inturned round bead $A^1$ which forms part of the swivel connection between the body and base turning knob. On its inner wall, the body A is formed with a long guide rib $A^2$ which fits into a vertical notch or recess $B^1$ of the follower B. Near its upper end, the body A is formed with an external bead $A^3$ to provide a seat for the cover E when the latter is in place.

The follower B is molded in cup shape form to receive the lower end of the stick S, and the base wall is formed with a centrally threaded sleeve $B^2$ to receive and cooperate with the screw-threaded stem C.

It may here be noted that the screws of the follower B and of the stem C are left-hand threads so that when the knob D is rotated clockwise in the usual way the stick will be ejected from the tubular body as shown in Fig. 3.

The base turning knob D completely closes the lower end of the body A but is formed with a reduced portion which extends upwardly into the body. This reduced portion is formed with an external annular groove $D^1$ which receives the internal annular bead $A^1$ and forms in conjunction therewith the aforesaid swivel connection between the turning knob and the body. The upper wall of the groove $D^1$ is constituted by an annular rib $D^2$ spaced circumferentially from the inside wall of the tubular body and chamfered at its upper side (as by bevelling or rounding) in order to cooperate during assembly, in the manner about to be described, with the internal annular bead $A^1$ of the body.

As clearly shown in Figs. 1 and 4, the body A is formed at its lower end or base with a slit $A^4$, which extends entirely through the bead $A^1$ and a short distance upwardly therefrom, this slit being preferably located in line with the rib $A^2$ which ordinarily is in the form of an interlocking stem joining the opposite ends of the sheet metal blank from which the body A is produced. Due to the presence of this slit $A^4$ and the elastic nature of the metal of the body, the latter may be resiliently expanded and contracted sufficiently to permit the parts to be assembled notwithstanding the solid or relatively non-yielding nature of the turning knob D. In other words, the relative dimensions of the body bead $A^1$ and the knob $D^2$ are such, in relation to the resilient expansibility and contractibility of the tubular body in its base zone, that during assembly the rounded rib $D^2$, by its engagement with the rounded bead $A^1$, will act as a cam in expanding the body A in its base zone and thus permit the bead $A^1$ to snap into the groove $D^1$ when the knob D is inserted into the lower end of the body. No great force is required to assemble the parts but, once assembled, the knob and body will remain permanently attached, even though the swivel connection will permit the knob to be turned freely in raising and lowering the follower for the projection or retraction of the stick.

It frequently happens that users, wittingly or unwittingly, attempt to turn the base knob in the wrong direction when the container-dispenser is first used, at which time the follower B occupies its lowermost position in contact with the turning knob, as shown in Fig. 2. To avoid such attempt, thus preventing stripping of the threads of the stem C and the follower sleeve $B^2$, the stem at its lower end and at the top of the turning knob D is provided with a small radial lug $C^1$ which is arranged to engage the upwardly curved or wedge shaped bottom wall of one or another of recesses $D^3$ formed in the bottom of the follower B. These recesses $D^3$ are created and separated by radial ribs $D^4$ which contact with the upper face of the knob D. The arrangement is such that when the follower is in its lowermost position (as assembled), the knob D is free to be rotated clockwise (in the right direction) for raising the follower to project the stick but will be locked against rotation in a counterclockwise direction (the wrong direction) by the binding engagement of the lug $C^1$ with the curved or wedge shaped bottom wall of whichever recess $D^3$ it happens to be located in after assembly of the parts. Of course, the knob is always free to be rotated in a counterclockwise direction to retract the stick in any raised position of the follower.

The second embodiment shown in Figs. 5 and 6 is intended for container-dispensers of larger size. In this embodiment, the follower B, screw-threaded stem C and base turning knob D are (except for size) the same as in the first embodiment. However, the body AA and removable cover EE are, in this instance, made of molded plastic material, the body being reduced in wall thickness at the top and exteriorly threaded to receive the interior threads of the removable cover EE, which latter when applied has its outer wall flush with the outer wall of the body. In this second embodiment, and since it is made of molded plastic material, the body AA is formed at its lower end with a plurality of slits $AA^4$, instead of one only, in order to render the body more readily expansible and contractible. As in the first embodiment, these slits extend through the annular bead $AA^1$ at the lower end of the body and a short distance above it. Consequently, when the turning knob $D^1$ is inserted into the lower end of the body AA, the annular rib $D^2$, by its engagement with the rounded bead $AA^1$, will expand the latter circumferentially until the groove $D^1$ arrives in place, whereupon the bead will contract and snap into the groove to provide the desired swivel connection between the knob and the body.

It will be understood that the invention is not limited to any specific form or embodiment except insofar as such limitations are specified in the appended claims.

What is claimed is:

1. A container-dispenser for cosmetics in solid stick form comprising, in combination, a tubular body, an interiorly threaded follower arranged within the body and having a slidable but non-rotatable engagement therewith, an exteriorly threaded stem also arranged within the body and having cooperative engagement with the follower, a rotatable knob arranged at the base of the body and secured non-rotatably to the stem, a swivel connection between the knob and body permitting the knob to be freely rotated in opposite directions in raising and lowering the follower, and means effective only in the lowermost position of the follower for preventing the rotation of the knob in the wrong direction so as thereby to avoid stripping of the threaded connection between the stem and the follower, said means being rendered ineffective by the rotation of the knob in the right direction to raise the follower from its lowermost position.

2. A container-dispenser according to claim 1, wherein the means for preventing the rotation of the knob in the wrong direction comprises a lug protruding from the stem and arranged to engage an obstructing portion on the follower.

3. A container-dispenser according to claim 1, wherein the means for preventing the rotation of the knob in the wrong direction comprises a lug protruding from the stem and arranged to engage a wedge shaped surface of a recess formed in the lower side of the follower.

References Cited in the file of this patent

UNITED STATES PATENTS

| | | |
|---|---|---|
| 1,944,067 | Collins | Jan. 16, 1934 |
| 2,816,654 | Fuller | Dec. 17, 1957 |
| 2,818,167 | McKinley | Dec. 31, 1957 |